(12) United States Patent
Angstead et al.

(10) Patent No.: US 10,492,536 B2
(45) Date of Patent: Dec. 3, 2019

(54) E-CIGARETTE WITH LASER ENHANCER

(71) Applicant: CRF VAP, LLC, Longmont, CO (US)

(72) Inventors: Ron A Angstead, Longmont, CO (US); Casey A Angstead, Longmont, CO (US)

(*) Notice: Subject to any disclaimer, the term of this patent is extended or adjusted under 35 U.S.C. 154(b) by 0 days.

(21) Appl. No.: 15/654,649

(22) Filed: Jul. 19, 2017

(65) Prior Publication Data

US 2018/0020734 A1 Jan. 25, 2018

Related U.S. Application Data

(60) Provisional application No. 62/363,954, filed on Jul. 19, 2016.

(51) Int. Cl.
*A24F 47/00* (2006.01)
*G02B 27/20* (2006.01)
*A24F 13/02* (2006.01)

(52) U.S. Cl.
CPC ............ *A24F 47/008* (2013.01); *G02B 27/20* (2013.01); *A24F 13/02* (2013.01)

(58) Field of Classification Search
CPC .................................................. A24F 47/008
USPC ........................................................ 131/273
See application file for complete search history.

(56) References Cited

U.S. PATENT DOCUMENTS

| | | | |
|---|---|---|---|
| 2005/0016550 A1* | 1/2005 | Katase | A24F 47/002 131/194 |
| 2014/0311503 A1* | 10/2014 | Liu | A24F 47/008 131/329 |
| 2015/0181930 A1* | 7/2015 | Liu | A24F 47/008 131/329 |
| 2015/0245661 A1* | 9/2015 | Milin | A24F 47/008 131/329 |

\* cited by examiner

*Primary Examiner* — Michael H. Wilson
*Assistant Examiner* — Rashid A Alam
(74) *Attorney, Agent, or Firm* — Patent Law Offices of Rick Martin, P.C.

(57) ABSTRACT

A rechargeable battery and a laser with a dispersal lens is housed in a power module of a vaporizer. A mini USB charging port is integral with the power module. A variety of tanks can be screwed onto the power module such as concentrate or buds or e-juice. After an inhalation the user can experience a 3D light show in his vape cloud, a lit up tank and a sound show.

18 Claims, 9 Drawing Sheets

E-CIGARETTE WITH LASER ENHANCER

CROSS REFERENCE APPLICATIONS

This non-provisional application claims priority from provisional application No. 62/363,954 filed Jul. 19, 2016.

FIELD OF INVENTION

The present invention relates to providing a battery powered vaporizer with a laser having a dispersal type optic.

BACKGROUND OF THE INVENTION

Tobacco smokers have used an electronic cigarette since before 1990. U.S. Pat. No. 5,269,327 (1993) to Counts et al. discloses a battery powered hand held cigarette that has a container for a medium which may have a tobacco flavor. An electrical heater heats the medium in order to emit vapors or aerosol which the user inhales. After inhalation the user exhales a visible cloud of gases. The medium may contain an aerosol-forming material, such as glycerin or water to form the smoke like cloud to simulate cigarette smoke. A control circuit and sensor sense an inhalation of the user. A heater is powered for a select time period such as from 0.8 to 1.2 seconds. A graphite heater is a preferred heater—active indicators can be LEDs. A charging port is supplied for rechargeable batteries.

Pub. No. US2015/0150305 published on Jun. 4, 2015. This e-cigarette has a USB charging port, an exhalation filter and a removable flower container adjacent the cooker chamber.

Pub. No. US2012/0260926 published on Oct. 18, 2012. A multi-functional electronic cigarette has a built in laser pointer. A liquid perfume is atomized by a heater controlled by a control chip. The laser beam displays light to a point for use as a pointer. A USB charging port is supplied.

Pub. No. CN104643288 published on May 27, 2015. An electronic cigarette has a laser pen built in for teaching and demonstration.

Pub. No. US2013/0284192 published on Oct. 31, 2013. FIGS. 6 and 11 add a light to an electronic cigarette. Further enhancements include a controller for enabling communications to the Internet for usage tracking or social networking.

It is known to produce a visible cloud or vapor. It is known to combine a laser pointer into an e-cigarette. What is needed in the art is a device that converts the laser pointer light beam into a dispersed beam which creates a 3D dazzling light show on the visible cloud.

SUMMARY OF THE INVENTION

An aspect of the present invention is to provide a dispersal lens on a laser on a Vapor Pen (e-cigarette) so as to provide a 3D light show for the user using their own vape cloud in combination with the laser beam.

Another aspect of the present invention is to provide a universal connector (Mouser 649-10118192-0001LF) at the end of the power module to allow use of a variety of tanks.

Another aspect of the present invention is to provide a programmable power adjustment to allow use of the power module with either a concentrate tank or a flower bud tank or an e-juice tank.

Another aspect of the present invention is to provide for a micro USB power source or a battery pack charging system using a standard USB-JK adapter charger.

Another aspect of the present invention is to provide a safety control circuit to prevent charging using an overpowered source.

Another aspect of the present invention is to provide a single button control of all variables including ON/OFF, power setting, inhale or laser ON/OFF; multiple displays of laser including steady beam, slow strobe, fast strobe etc.

Another aspect of the present invention is to provide a circuit to prevent under-charging thereby always having enough power to energize a blinking charging LED.

Another aspect of the present invention is to use the status indicator LED to direct a beam of light up into the tank to provide an entertaining light up of the tank as the user inhales.

Another aspect of the present invention is to trigger a sound chip when the power button is depressed, thus the user can have both a light and/or sound go off during inhalation.

Other aspects of this invention will appear from the following description and appended claims, reference being made to the accompanying drawings forming a part of this specification wherein like reference characters designate corresponding parts in the several views.

In operation a single power button can be depressed to power the heater. The heater vaporizes a small amount of the chosen chemical (marijuana concentrate, e-juice, etc.) into a chamber. Then the user inhales the vapor. During exhalation, forming a cloud, the user can press the power button for example (three times within one second) then hold, and a laser turns on having a chosen dispersal lens, thereby enabling the user to create a plurality of 3D images in the vapor cloud. U.S. Pat. No. 5,450,148 is incorporated herein in its entirety to enable the variable laser image technology. Optionally the "vapor pen" can light up the tank and/or play a pre-recorded sound when the power button is depressed.

Other features include either a micro USB port for charging, or a conventional USB battery pack connector to a charger. The micro USB port has an over-power safety shut off circuit.

The power module has a universal thread connector to allow use of several different tanks.

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DETAILED DESCRIPTION OF THE DRAWINGS

Figure 1:
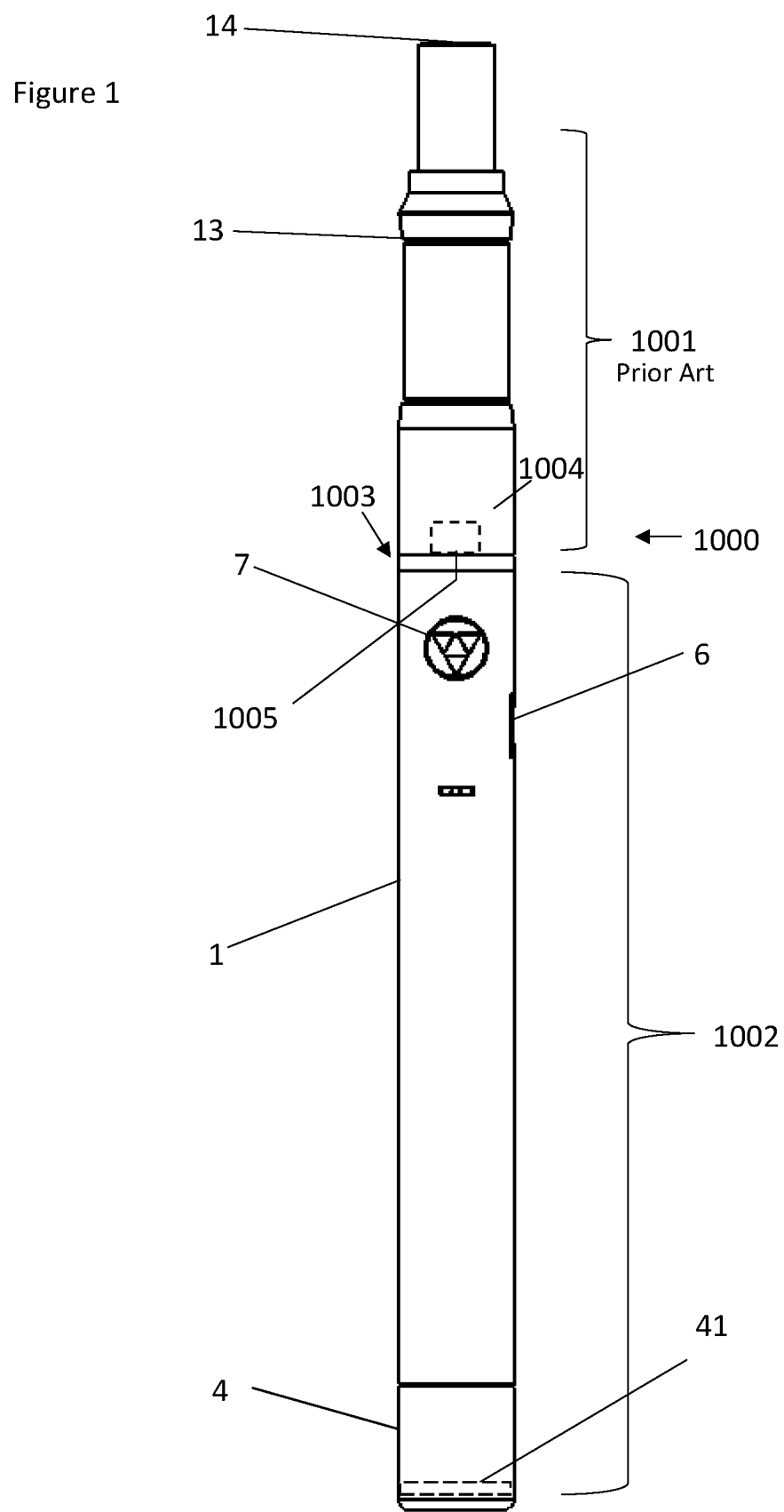
FIG. 1 is a front elevation view of the vaporizer laser pen.

Referring first to FIG. 1 a vaporizer laser pen 1000 has a tank module 1001 and a power module 1002. A threaded interface of modules 1001, 1002 is indicated by arrow 1003.

The tank module has a mouth piece 14, a tank 13 and a mounting collar 1004.

The power module 1002 has an upper male connector 1005, a power button 7, a micro USB port 6, a laser lens holder cap 4, and a battery housing 1.

Figure 2:
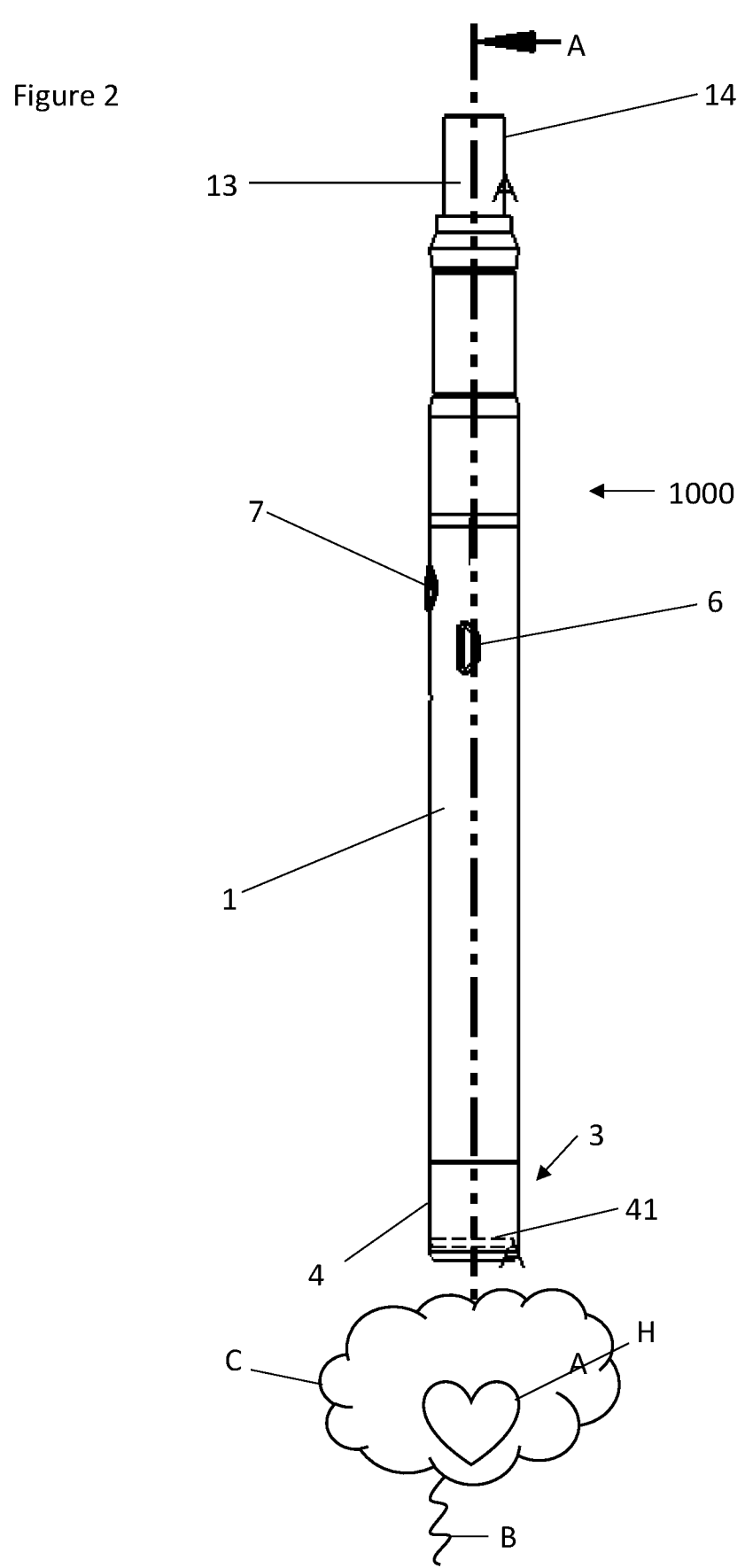
FIG. 2 is a side elevation view of the vaporizer laser pen.

Referring next to FIG. 2 the laser 3 emits a beam B through an interchangeable dispersal lens 41 housed in rotatable cap 4. A 3D design H can be formed in the vapor cloud C.

Figure 3:
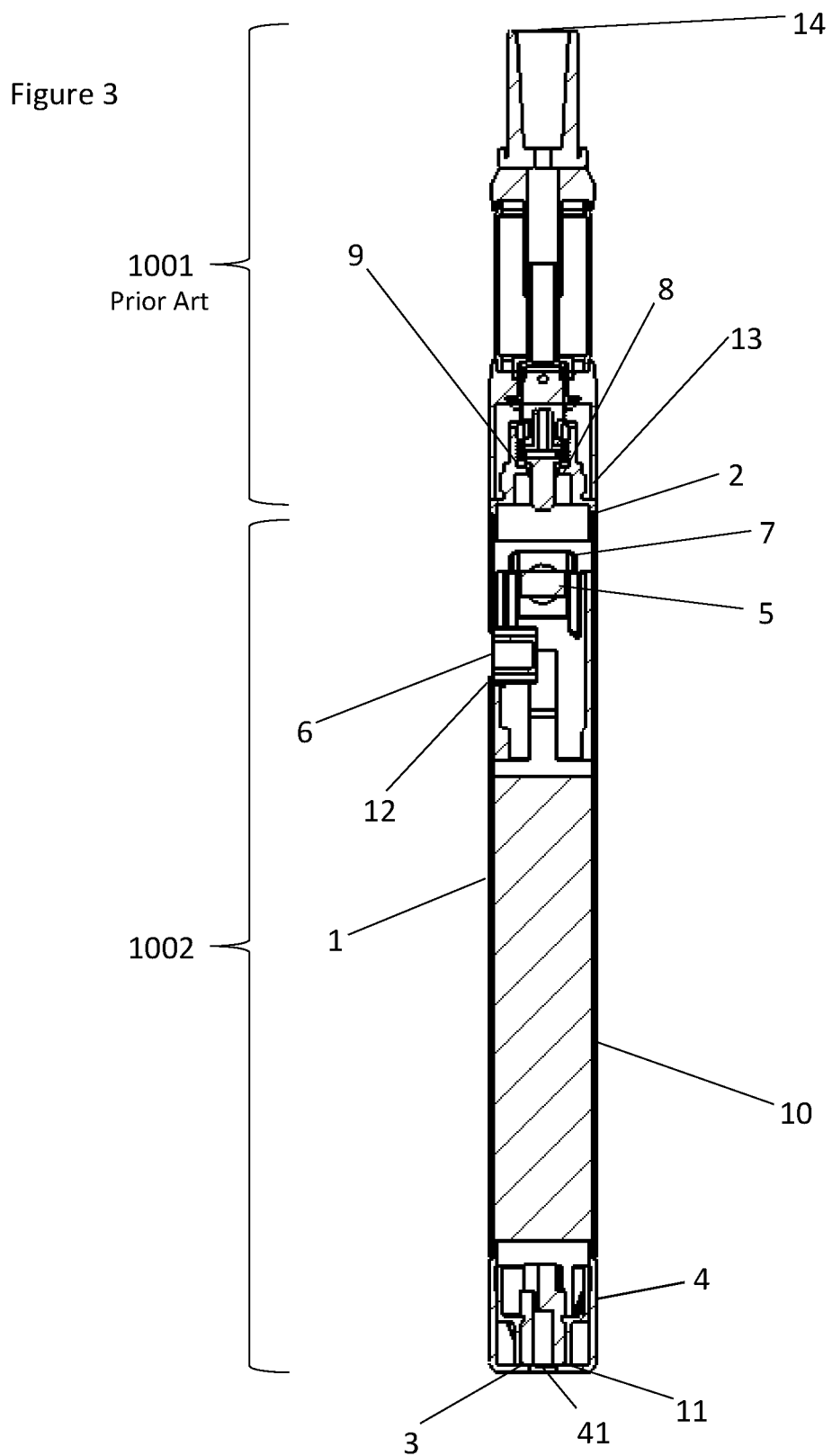
FIG. 3 is a longitudinal cross sectional view of the vaporizer laser pen taken along lines A-A of FIG. 2.

Referring next to FIG. 3 a (Li-ion) battery 10 is housed in the battery housing 1. The laser 3 is a JameCo 5mW3VRed dot laser or similar laser. The electronics housing 2 secures a circuit board 5, via a circuit board mount (reverse PCB) 12.

Figure 4:
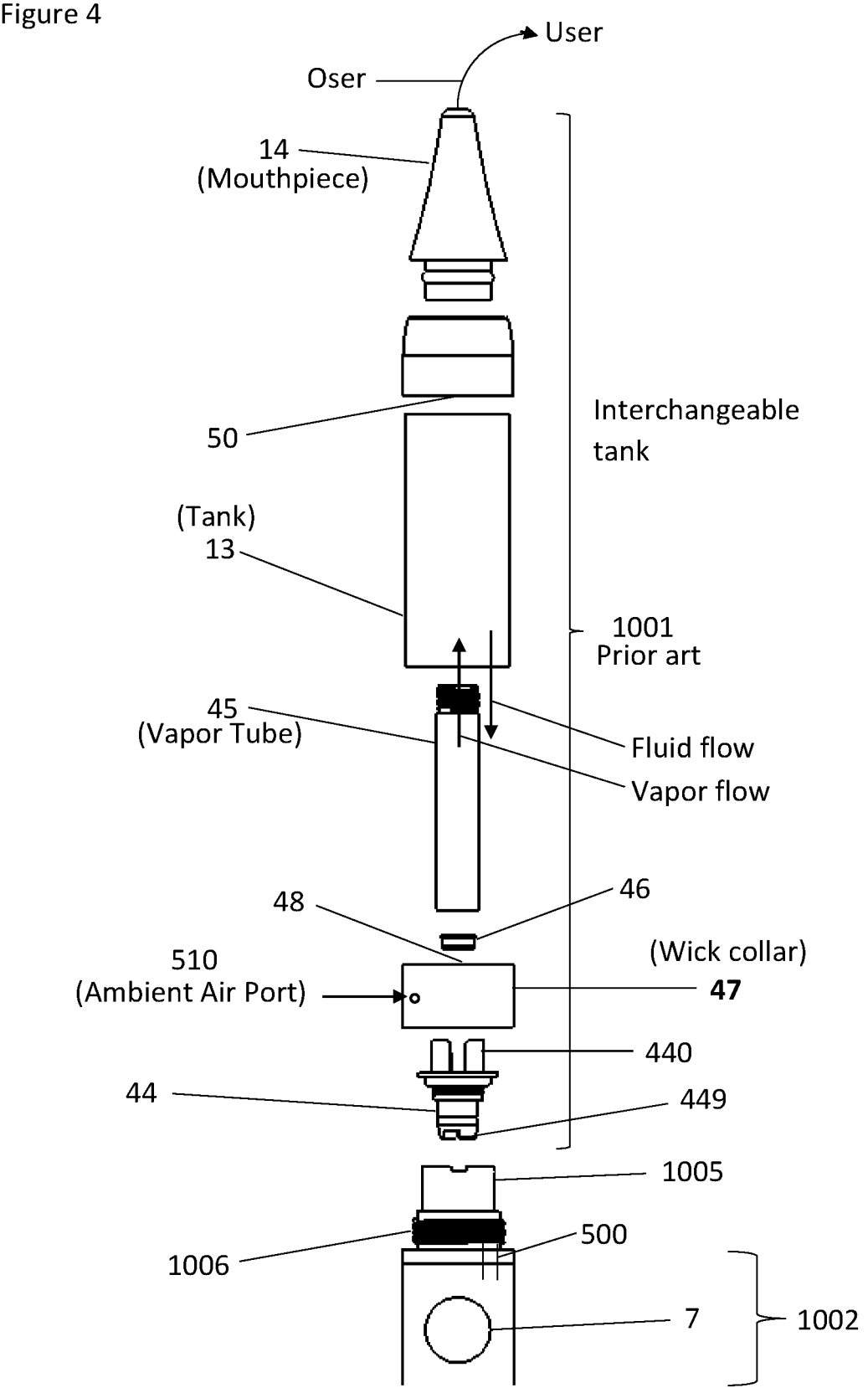
FIG. 4 is an exploded view of the vaporizer laser pen mouthpiece, tank module and atomizer shown in FIG. 3.

A (brass) contact 8 connects battery power to the heater 44 shown in FIG. 4. A battery contact gasket 9 allows the power module 1002 to be tightly screwed onto the tank module 1001. A laser mounting clip 11 secures the laser 3 in place.

Referring next to FIG. 4 the tank module 1001 is prior art. The vapor tube 45 mounts inside the hollow in the tank 13. Arrow VAPOR FLOW shows the path of the vapor as the user inhales on the mouthpiece 14. Arrow OSER shows the vapor entering the user's mouth. Arrow FLUID FLOW shows the concentrate flowing into the wick assembly 48. The wire heater inside the heater 44 heats the wick assembly 48 to discharge a vapor into a small reservoir 440 which is in fluid communication with the transfer tube 46 that enters the vapor tube 45 which, in turn, screws into the mouthpiece at port 50. Contact 449 seats into power jacks (not shown).

Ambient air enters the small reservoir 440 via ports 51 in the wick collar 47.

The mounting collar 1006 connects the power module 1002 to the tank module 1001 via universal threads (510 thread metric) 1006 on the male connector 1005. Ambient air inlet is shown as item 510.

The power to button 7 controls all functions. An LED indicator light 70 (FIG. 5) can emit red (R), green (A), blue (B) for various power settings programmed by depressing the power button 7. There are several functions that are controlled through the use on a single micro-switch. One sequence of steps is shown below:

1) 5 clicks on . . . 5 clicks off (Industry standard for Vapor pens)
2) While off; hold button . . . indicates battery status, Red, Yellow or Green.
3) While on; hold button . . . indicated heat setting . . . Red, Yellow, Green.
4) 2 clicks, hold second click down activates Laser beam.
5) 3 clicks activates Laser pattern options, single click changes option to next, strobe pattern, faster strobe, steady beam, hold to set pattern.
6) 4 clicks blinks the LED temperature setting, click once to change to the next setting, hold to set temperature. One skilled in the art can vary the number of clicks to any desired control function.

Figure 5:
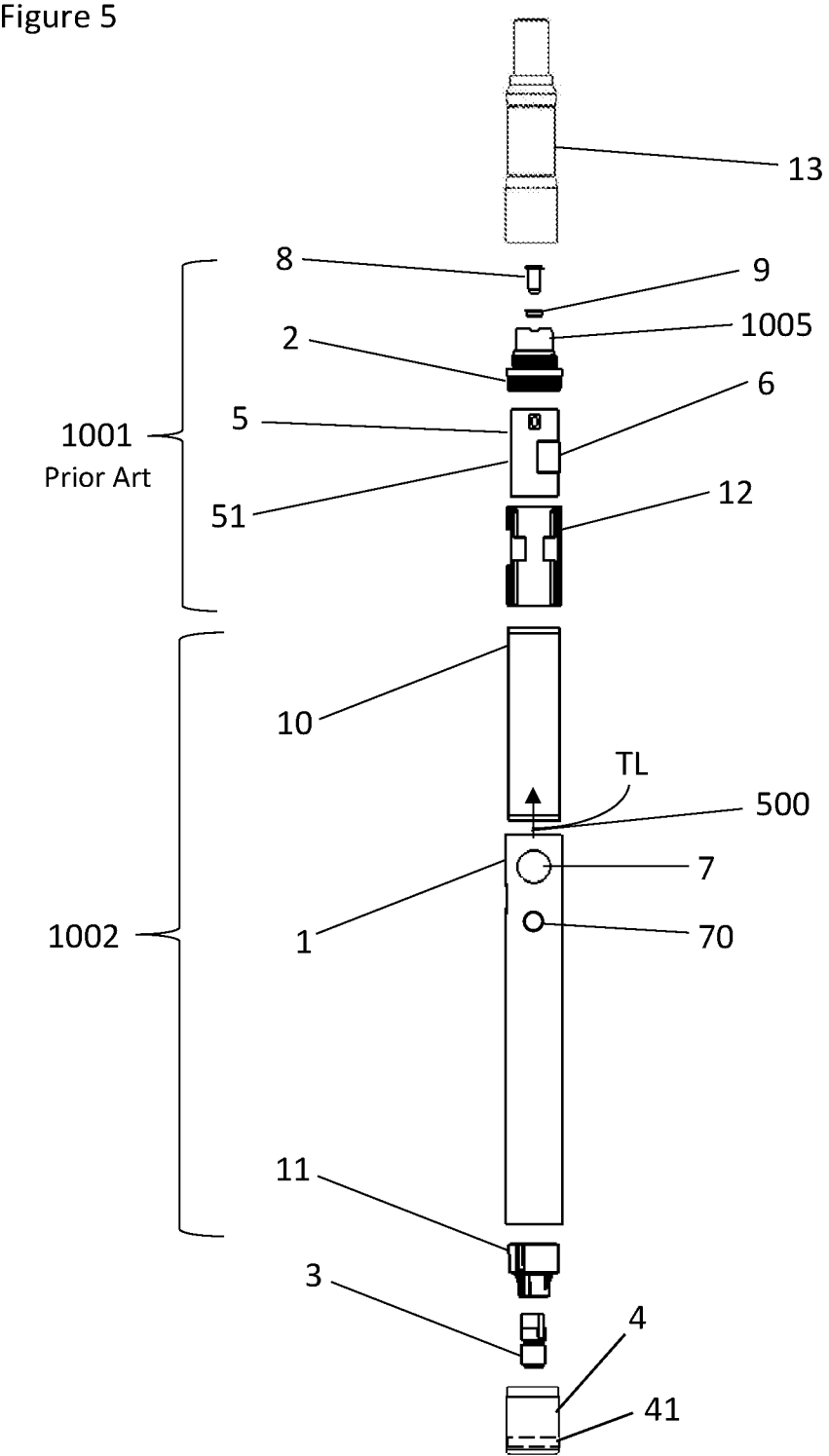
FIG. 5 is an exploded view of the vaporizer laser pen tank module, power module and laser assembly.
Figure 6:
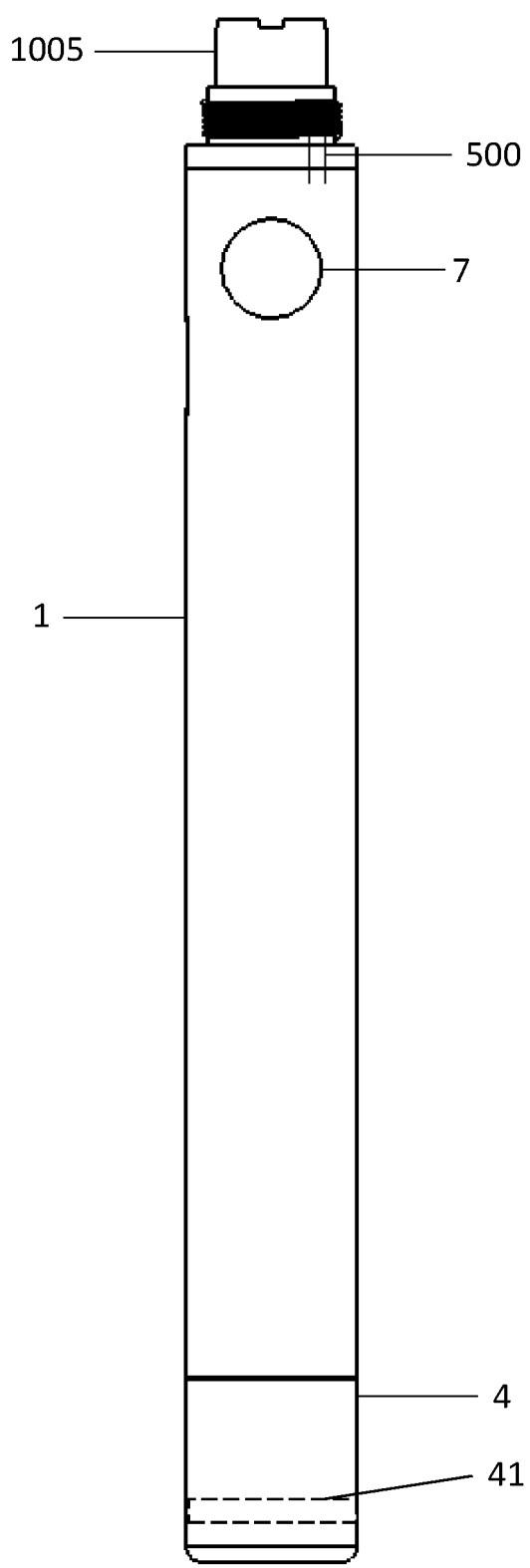
FIG. 6 is a front elevation view of the power module.

Referring next to FIGS. 5, 6 the male connector 1005 serves as the electronics housing 2. An optional port 500 on top of the power module 1002 transmits a beam of light TL from the LED light 70 up to light up the tank 13 which is a translucent or transparent container. Also an optional sound chip 51 on circuit board 6 can make a pre-programmed sound (such as a short music tune) as the power button 7 is depressed. An optional input jack allows a user to download a chosen sound or song. Thus, a user can inhale, see a light, hear a sound, and then form his 3D image as shown in FIG. 2.

Figure 7:
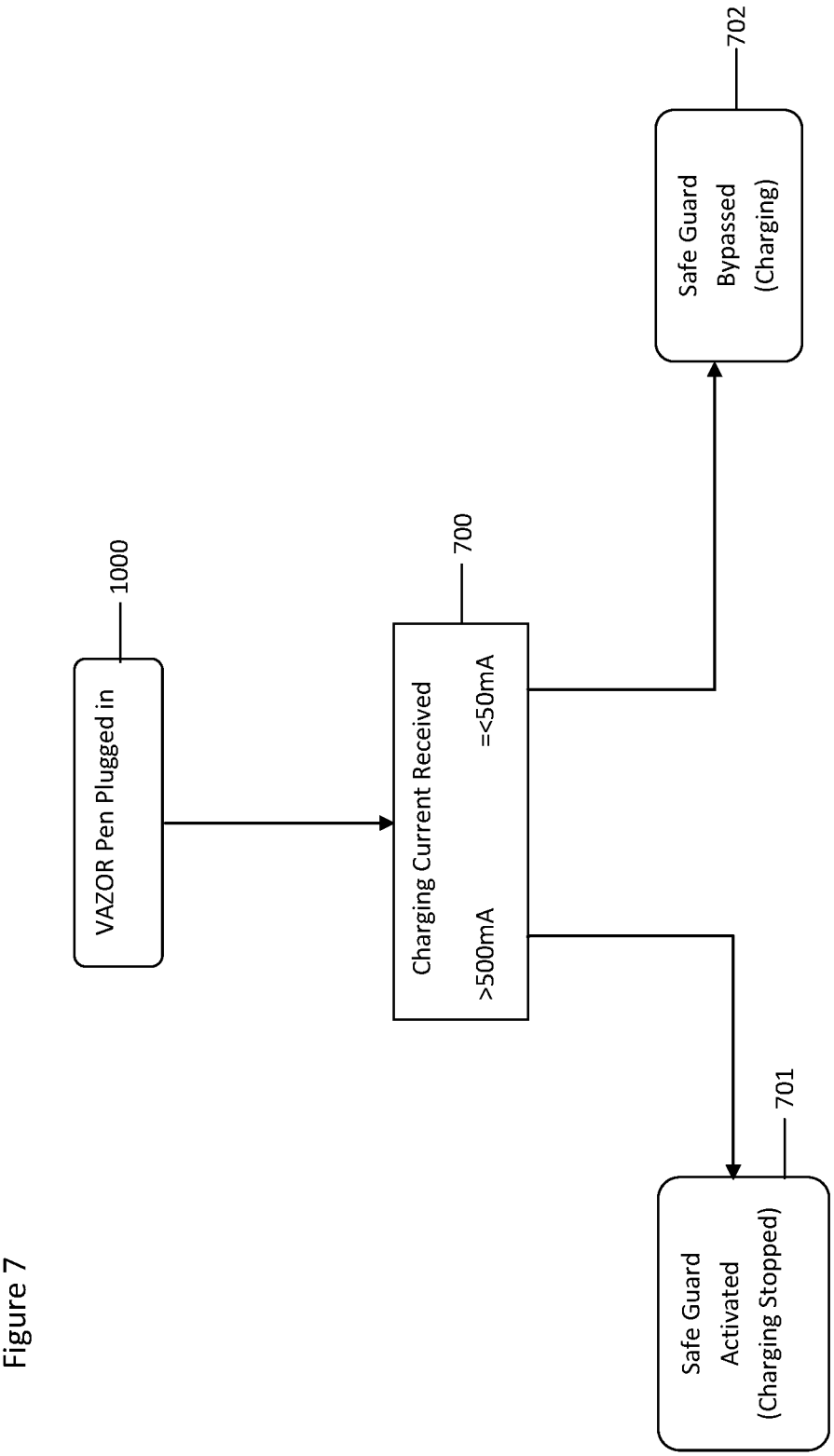
FIG. 7 is a flow chart of the power safety circuit.

Referring next to FIG. 7 the laser vaporizer 1000 is plugged in via the port 6. For charging circuit module 700 determines if the charging current is safe. If the charging current is greater than 500 mA, charging is stopped in block 701. If the charging current is less than 50 mA, then the current is allowed to pass to the vape pen shown by block 702.

Figure 8:
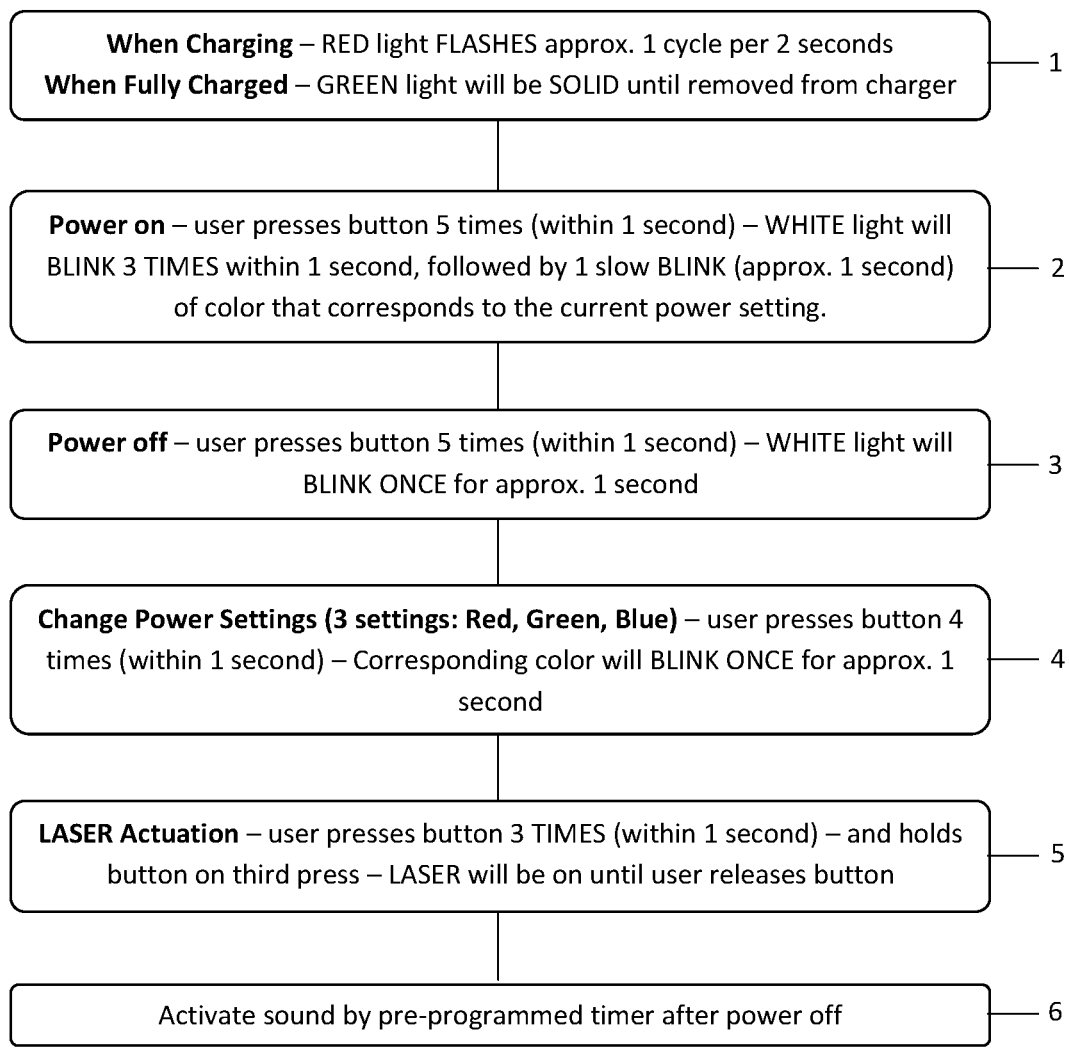
FIG. 8 is a flow chart of the control logic module.

Referring to FIG. 8 block 1 is charging mode. Block 2 is power on. Block 4 is power setting. Block 3 is power off. Block 5 is laser actuation. Block 6 is activate sound.

Figure 9:
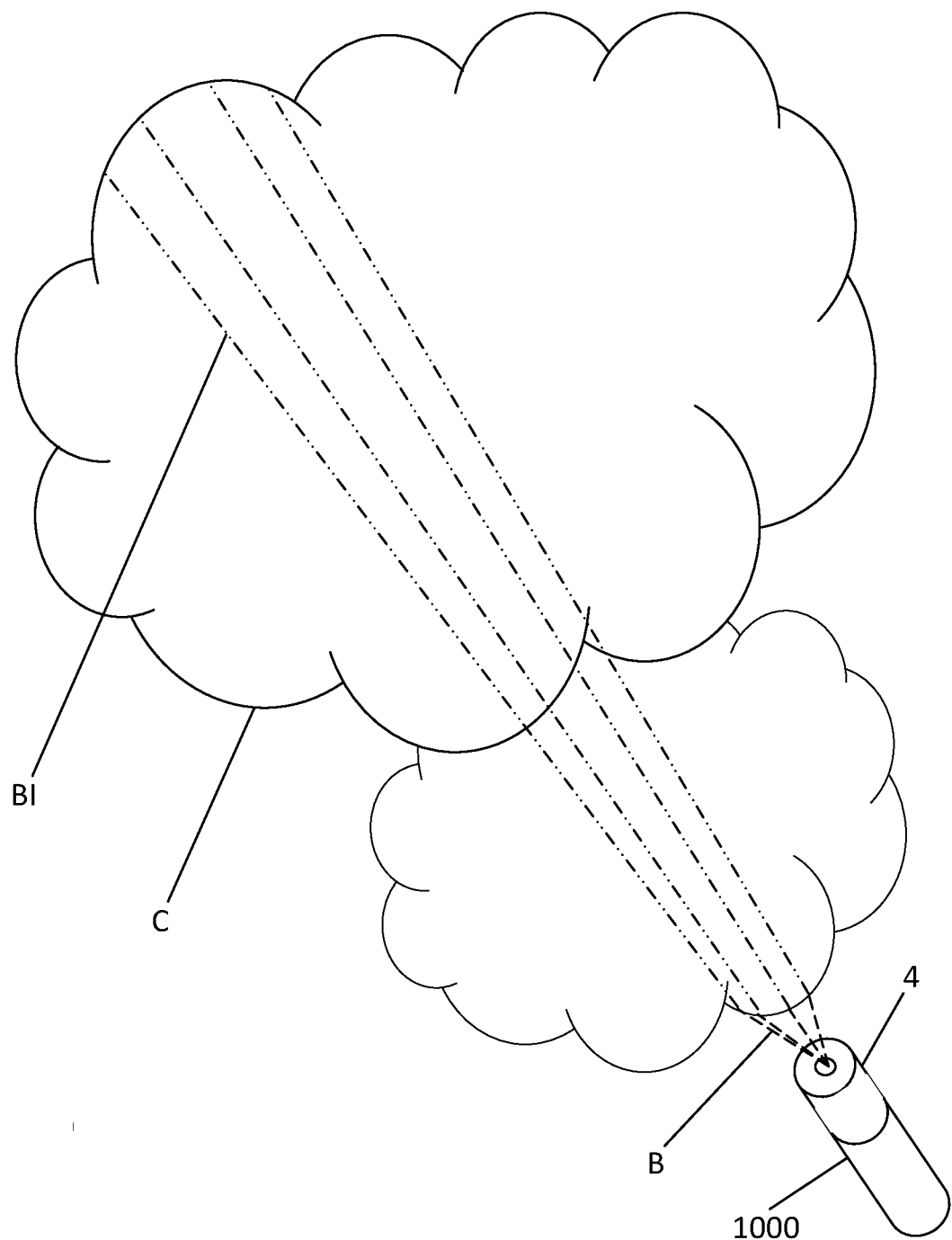
FIG. 9 is a front perspective view of a vaporizer laser pen projecting a dispersed laser image into a vape cloud.

Referring next to FIG. 9 the vaporizer laser pen 1000 is projecting a dispersed beam B into image BI in vape cloud C. By rotating the cap 4 the image BI changes.

Although the present invention has been described with reference to the disclosed embodiments, numerous modifications and variations can be made and still the result will come within the scope of the invention. No limitation with respect to the specific embodiments disclosed herein is intended or should be inferred. Each apparatus embodiment described herein has numerous equivalents.

We claim:

1. An e-cigarette comprising:
    a housing having a longitudinal axis, an air inlet and a vapor outlet;
    said housing having a connection for a bottle with a liquid or a container with a solid or a container with an e-juice;
    an air flow channel in the housing connecting the air inlet to the vapor outlet;
    an atomizer assembly in the housing between the air inlet and the vapor outlet;
    a microprocessor controller to provide a programmable power adjustment for various mediums;
    a battery with a micro USB power source for charging;
    a laser pointer having an adjustable dispersal lens;
    the laser pointer emitting a beam thru the adjustable dispersal lens forming a 3D design on a vapor cloud formed from the e-cigarette;
    a laser controller to control flashing, power, and strobe rates for the laser pointer;
    a medium container light having a port to the bottle or the container for lighting same, and an activate circuit controlled by an inhalation sensor; and
    a sound chip and an activate circuit controlled by the inhalation sensor.

2. The electronic cigarette of claim 1, wherein a single power button activates via a series of distinct depression sequences each control variable in the microprocessor and laser controller.

3. The electronic cigarette of claim 1, wherein the sound chip has a port on the housing to receive a recording.

4. The electronic cigarette of claim 1, wherein the housing further comprises a detachable adjustable dispersal lens for the laser pointer.

5. An electronic cigarette, comprising:
    a housing having a longitudinal axis, an air inlet and a vapor outlet;
    said housing having a connection for a plurality of different medium containers including a container for a solid, a container for a liquid, and a container for an e-juice;
    an air flow channel in the housing connecting the air inlet to the vapor outlet;
    an atomizer assembly in the housing between the air inlet and the vapor outlet;
    a variable power supply for heating the plurality of different medium containers;
    a laser pointer;

a dispersal lens having adjustable image outputs on the laser pointer;

the laser pointer emitting a beam thru the adjustable dispersal lens forming a 3D design on a vapor cloud formed from the e-cigarette; and a laser controller to control a flashing, a power and a strobe variable for the laser pointer.

6. The electronic cigarette of claim 5 further comprising a battery with a micro USB power source for charging.

7. The electronic cigarette of claim 5 further comprising a medium container light having a port to the bottle or the container for lighting same, and an activate circuit for the medium container light controlled by an inhalation circuit.

8. The electronic cigarette of claim 5 further comprising a sound chip.

9. The electronic cigarette of claim 8, wherein the sound chip has a port to receive various recordings.

10. The electronic cigarette of claim 8, wherein the sound chip is activated by an inhalation sensor.

11. The electronic cigarette of claim 5, wherein a single switch controls the variable power supply and the laser controller.

12. The electronic cigarette of claim 5, wherein the dispersal lens further comprises an interchangeable set of dispersal lenses.

13. A method to entertain a smoker, the method comprising the steps of:

forming an electronic cigarette having a laser pointer with a dispersal lens;

inhaling a vapor from the electronic cigarette;

exhaling a cloud of vapor; and shining the laser pointer with the dispersal lens into the cloud to create an entertaining 3D image.

14. The method of claim 13 further comprising the step of activating a sound chip in the electronic cigarette while shining the laser pointer into the cloud.

15. The method of claim 13 further comprising the step of activating an LED light using an inhalation sensor to light up a medium container during inhalation.

16. The method of claim 13 further comprising the step of adjusting a flashing of the laser pointer.

17. The method of claim 13 further comprising the step of adjusting a power of the laser pointer.

18. The method of claim 14 further comprising the step of loading a chosen sound into the sound chip.

* * * * *